(12) United States Patent
Monson et al.

(10) Patent No.: US 12,539,200 B2
(45) Date of Patent: Feb. 3, 2026

(54) DEVICES FOR TREATING TRISMUS AND METHODS OF USE

(71) Applicant: Bite Ease, LLC, Langhorne, PA (US)

(72) Inventors: Virginia C. Monson, Langhorne, PA (US); Stephen H. Monson, Langhorne, PA (US)

(73) Assignee: Bite Ease, LLC, Langhorne, PA (US)

( * ) Notice: Subject to any disclaimer, the term of this patent is extended or adjusted under 35 U.S.C. 154(b) by 436 days.

(21) Appl. No.: 17/516,972

(22) Filed: Nov. 2, 2021

(65) Prior Publication Data

US 2022/0142734 A1    May 12, 2022

Related U.S. Application Data

(60) Provisional application No. 63/112,709, filed on Nov. 12, 2020.

(51) Int. Cl.
| | |
|---|---|
| *A61C 5/00* | (2017.01) |
| *A61C 7/08* | (2006.01) |
| *A61C 7/10* | (2006.01) |
| *A61C 7/36* | (2006.01) |

(52) U.S. Cl.
CPC ............... *A61C 5/007* (2013.01); *A61C 7/08* (2013.01); *A61C 7/10* (2013.01)

(58) Field of Classification Search
CPC .. A61C 7/10; A61C 7/08; A61C 5/007; A61C 7/36; A61C 19/06; A61F 5/05891; A61F 5/0003; A61F 5/0006; A61F 5/566; A61F 5/58; A61F 5/56; A61F 2005/563; A63B 23/032; A63B 23/03; A63B 23/025; A63B 21/05

See application file for complete search history.

(56) References Cited

U.S. PATENT DOCUMENTS

| | | | |
|---|---|---|---|
| 1,714,029 A | 5/1929 | Kuhn | |
| 1,851,865 A | 3/1932 | Ptacek | |
| 3,721,439 A | 3/1973 | Rudolph et al. | |
| 4,909,502 A | 3/1990 | Beeuwkes, III et al. | |
| 4,991,566 A | 2/1991 | Shulman et al. | |

(Continued)

FOREIGN PATENT DOCUMENTS

| | | |
|---|---|---|
| DE | 69015148 T2 | 6/1995 |
| EP | 0439889 B1 | 12/1994 |

(Continued)

OTHER PUBLICATIONS

Chaitanya, Nallan C.S.K., A New Intraoral Applicance for Trismus in Oral Submucous Fibrosis, Hindawi Case Reports in Dentistry, vol. 2018, Article ID 1039391, 5 pages, https://doi.org/10.1155/2018/1039391.

*Primary Examiner* — Victoria Hicks Fisher
(74) *Attorney, Agent, or Firm* — Caesar Rivise, PC

(57) ABSTRACT

A device and method treating Trismus in a patient. The device is configured to be located completely within the mouth of the patient and includes a pair of teeth-receiving plates and at least one adjustable biasing assembly. The adjustable biasing assembly pivotably interconnects the teeth-receiving plates and is adjustable to establish a desired spacing between anterior portions of the teeth-receiving plates, and also provides a force to the teeth-receiving plates tending to bias the anterior portions of those plates to the desired spacing.

10 Claims, 1 Drawing Sheet

(56) References Cited

U.S. PATENT DOCUMENTS

| | | | |
|---|---|---|---|
| 5,097,820 A | | 3/1992 | Shulman et al. |
| 5,855,535 A | | 1/1999 | Shafer |
| 8,702,569 B2 | | 4/2014 | Martin et al. |
| 9,149,675 B2 | | 10/2015 | Kubik et al. |
| 9,656,114 B1 | * | 5/2017 | Hafeez-Bey ..... A63B 21/00069 |
| 11,064,925 B2 | | 7/2021 | Davis |
| 2005/0241650 A1 | * | 11/2005 | Lombardi ................ A61C 7/36 |
| | | | 128/859 |
| 2007/0037665 A1 | | 2/2007 | Robbins et al. |
| 2012/0283069 A1 | * | 11/2012 | Martin ................ A63B 23/032 |
| | | | 482/11 |
| 2015/0245888 A1 | * | 9/2015 | Hasegawa ................ A61C 7/36 |
| | | | 433/19 |
| 2020/0163795 A1 | | 5/2020 | Garcia Reyes et al. |

FOREIGN PATENT DOCUMENTS

| | | | |
|---|---|---|---|
| WO | 01/24757 A1 | 4/2001 | |
| WO | 2014/066321 A3 | 5/2014 | |
| WO | WO-2016170417 A1 * | 10/2016 | ............... A61C 7/36 |

\* cited by examiner

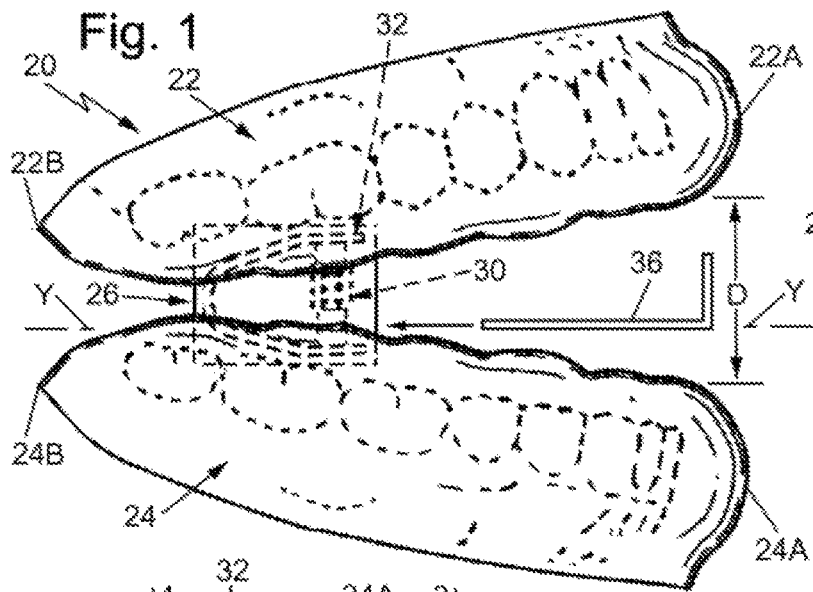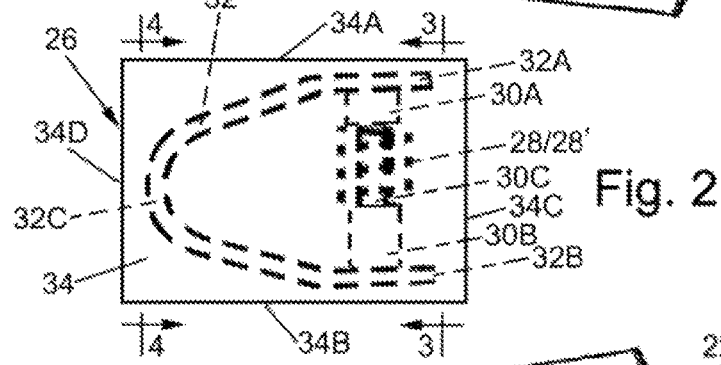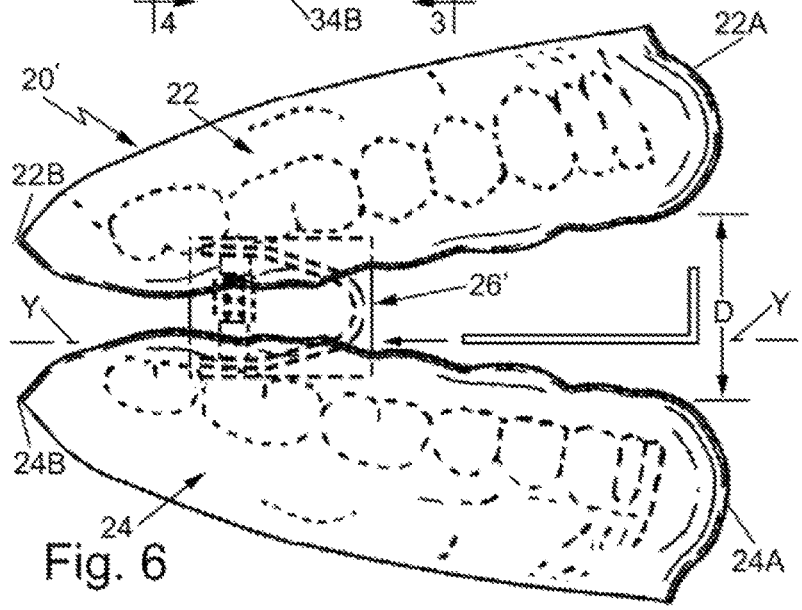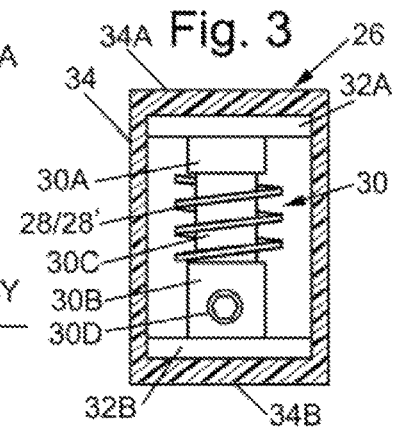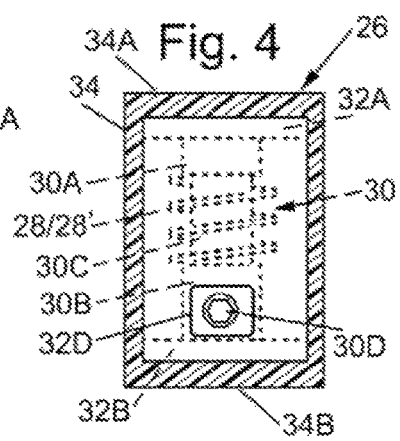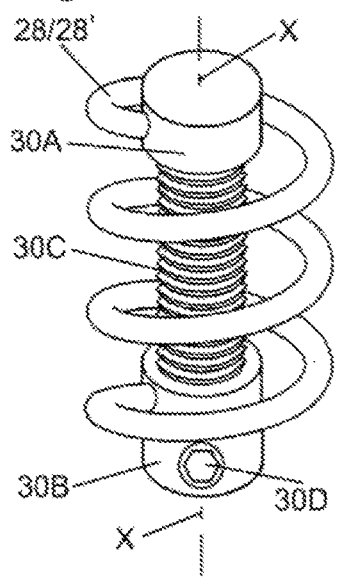

DEVICES FOR TREATING TRISMUS AND METHODS OF USE

CROSS-REFERENCE TO RELATED APPLICATIONS

This utility application claims the benefit under 35 U.S.C. § 119(e) of Provisional Application Ser. No. 63/112,709, filed on Nov. 12, 2020, entitled Devices For Treating Trismus And Methods Of Use, which is assigned to the same assignee as this application. The entire disclosure of the aforementioned Provisional Application is incorporated by reference herein.

FIELD OF THE INVENTION

This invention relates generally to medical devices and more particular to devices for treating Trismus and methods of treating Trismus.

BACKGROUND OF THE INVENTION

Trismus, also known as "lockjaw," is a painful medical condition affecting a large number of people. In general, it can result from trauma, oral surgery, temporomandibular joint disorders (TMJD), or for patients who have received radiation therapy for oral and head and neck cancers.

Trismus results in sustained tetanic spasm of the masticory muscles, interfering with the patient's ability to eat, swallow, and impeding normal speech.

The normal range of a mouth opening varies, but is generally found to be between 40 to 60 mm, which corresponds to a two-three finger breadth inserted sideways in the mouth. Patients with Trismus are unable to open their mouth to this range.

Traditional therapeutic practice for treating Trismus is to use tongue depressors stacked together and rubber banded. The stack is placed into the mouth between the upper and lower front teeth, and held for 30 seconds, repeating the action five to seven times. In addition, other mouth exercises are used. This process is done typically five to seven times daily. As it becomes easier to open the jaw from a beginning limited sized mouth opening, the person afflicted will typically add more tongue depressors until he/she reaches the desired size opening, e.g., the width of approximately 40 to 60 mm. The results are not permanent and the same process must be repeated every day.

Currently there are two manufactured devices available for the treatment of Trismus: the TheraBite device; and the Jaw Clamp device. While both of those devices are generally suitable for their intended purposes, both suffer from several drawbacks, such as complexity of construction and a tendency in some cases to loosen the front teeth after repeated use. In addition, both devices require considerable hand strength to operate, since they require squeezing of portions extending out of the mouth to accomplish the opening of the jaw.

The patent literature includes various other devices for treating Trismus. For example, U.S. Pat. No. 9,149,675 (Kubik et al.) discloses a device for Trismus prevention and treatment. It includes a first arm hingedly connected to a second arm, and a spring device disposed therebetween to press the first and second arms apart. A pair of bite pads is provided at the ends of each of the first and second arms. The bite pads are designed to be engaged by a user's teeth or gums in order to bite down on the device to exercise the user's jaw, and more specifically, the muscles of mastication.

U.S. Pat. No. 4,909,502 (Beeuwkes, III et al.) discloses a passive jaw exerciser for application of an anatomically applied jaw moving force for pivoting of the jaw at its temporomandibular joint or to provide a motion to the jaws which is beneficial in facial orthopedics. A body structure is provided having guide tracks which guide movement of a carriage according to the character of movement that is desired. The carriage is movable by a lever operated push rod to thereby cause corresponding movement of a mandibular jaw piece supported by a carriage relative to a maxillary jaw piece supported by the exerciser body. The position of engagement between the lever and the push rod is adjustable through selection of any one of a number of spaced slots that are formed in parallel webs of the lever structure.

U.S. Pat. No. 5,097,820 (Shulman et al.) discloses a device for dilating and propping open a patient's jaws. The device includes a pair of outwardly-extending upper arms and a pair of outwardly extending lower arms. Each of the arms has a respective distal end which has a pad pivotally mounted thereon which contacts the patient's jaws during use thereof, and a respective proximal end which is pivotably secured to the housing. Means are provided for pivoting the distal ends of the upper arms towards and away from the distal end of the lower arms such that the distal ends move substantially arcuately between the open and closed positions. A worm and worm wheel arrangement is provided for pivoting the arms, such that the spacing therebetween is infinitely variable.

U.S. Published Patent Application 2007/0037665 (Robbins et al.) discloses an oral exercise device that is portable, that has adjustable resistance and that allows the tongue to perform isotonic exercises in an environment that closely approximates the natural configuration of the tongue and the mouth to improve disorders of speech and swallowing.

Case Reports in Dentistry, Volume 2018, Article ID 1039391, found at https://doi.org/10.1155/2018/1039391 by Nallan C. S. K. Chaitanya et al. entitled "A New Intraoral Appliance for Trismus in Oral Submucous Fibrosis" published on Sep. 9, 2018 discloses an intraoral appliance for treating Trismus. The intraoral appliance is in the form of a molded acrylic upper plate configured for receiving the upper teeth of a person, a lower molded acrylic upper plate configured for receiving the lower teeth of a person, and Hyrax screws placed within the upper and lower acrylic plates. The Hyrax screws enable the spacing between the upper and lower plates to be adjusted, but must be adjusted by a physician.

In addition to the above Trismus treatment devices, the patent literature includes various devices generally described as jaw strengthening devices, such as U.S. Pat. No. 8,702,569 (Martin et al.); U.S. Pat. No. 11,064,925 (Davis); U.S. Pat. No. 9,656,114 (Hafeez-Bey); U.S. Pat. No. 5,855,535 (Shafer); U.S. Pat. No. 3,721,439 (Rudolf et al.); U.S. Pat. No. 1,714,029 (Kuhn); and U.S. Pat. No. 1,851,865 (Ptacek). U.S. Published Application 2020/0163795 (Reyes et al.) relates to an intra-oral device for mandibular adjustment applicable for sleep apnea, respiratory disorders and bruxism.

While the devices disclosed in the above mentioned patents/applications also appear suitable for their intended purposes, they leave something to be desired from the standpoints of simplicity and compactness of construction, ease of use, potential to loosen teeth, while addressing the underlying medical condition of Trismus. Thus, there is a need for a device that addresses those drawbacks of the prior art. The subject invention addresses that need. It does so by providing a device that should be easier to use, with less effort and pain. The subject invention is configured to be located totally within the mouth and once positioned, allows the patient operatively to gradually open the mouth, not from the front of the mouth, but from mid-mouth towards the back to gradually manipulate the muscle of the jaw to open with less stress on the teeth, thereby making the process easier and less painful for the patient, while providing the patient relief from the pain associated with Trismus. With respect to Jaw exerciser devices, none of the devices found appear to be designed to address the underlying medical condition of Trismus, rather they are focused on muscle strengthening and, in some instances, cosmetic appearance of the face.

All references cited and/or identified herein are specifically incorporated by reference herein.

SUMMARY OF THE INVENTION

One aspect of this invention is a device for treating Trismus in a patient. The device is configured to be located completely within the mouth of the patient without any portion extending out of the mouth of the patient. The device comprises a pair of teeth-receiving plates, and at least one adjustable biasing assembly. Each of the teeth-receiving plates includes an anterior portion and a posterior portion, with one of the plates being disposed over the other of the plates to establish a space between the anterior portions of the plates. The at least one adjustable biasing assembly interconnects the teeth-receiving plates between the anterior portion and the posterior portion and is configured for pivotably connecting the pair of teeth-receiving plates to each other to establish a desired spacing between the anterior portions of the teeth-receiving plates and for providing a bias force to the teeth-receiving plates. The at least one adjustable biasing assembly is adjustable to adjust the desired spacing.

In accordance with one preferred aspect of the device of this invention, the adjustable biasing assembly comprises a hinge, a spring, and an adjustment mechanism. The hinge interconnects the teeth-receiving plates between the anterior portion and the posterior portion of the teeth-receiving plates. The spring is coupled between the teeth-receiving plates adjacent to the hinge and is configured to either naturally expand or naturally contract, whereupon a bias force is applied by the spring to the teeth-receiving plates. The adjustment mechanism is coupled to the spring and configured to adjust the amount that the spring expands to a desired expanded state or contracts to a desired contracted state, in either case establishing a desired space between the anterior portions of teeth-receiving plates.

In accordance with another preferred aspect of the device of this invention, the device is configured so that the teeth-receiving plates can be pivoted together at the hinge to a closed position, whereupon the anterior portions of the teeth-receiving plates are closely adjacent to each other to enable the device to be readily inserted into the mouth of the patient, whereupon the bias provided by the spring in the desired expanded state or the desired contracted state causes the teeth-receiving plates to naturally pivot apart from each other to a desired open position wherein the anterior portions of the teeth-receiving plates are at said desired space from each other.

In accordance with another preferred aspect of the device of this invention, each of the teeth-receiving plates includes a pair of sides and wherein the device comprises two adjustable biasing assemblies, one of the adjustable biasing assemblies located adjacent one of the pair of sides and the other of the adjustable biasing assemblies located adjacent the other of the pair of sides.

In accordance with another preferred aspect of the device of this invention, the adjustment mechanism includes a rotatable component. The rotatable component is configured to be rotated by a tool to adjust the amount that the spring expands to a desired expanded state or contracts to a desired contracted state.

In accordance with another preferred aspect of the device of this invention, each of the teeth-receiving plates is molded of a strong material to distribute the bias force thereacross.

In accordance with another preferred aspect of the device of this invention, the hinge comprises a flexible strip formed of a strong biocompatible material.

In accordance with another preferred aspect of the device of this invention, the biocompatible material comprises stainless steel or titanium.

In accordance with another preferred aspect of the device of this invention, the adjustable biasing assembly additionally comprises a body encapsulating the hinge, the spring and the adjustment mechanism.

In accordance with another preferred aspect of the device of this invention, the body comprises a resilient material.

Another aspect of this invention is a method for treating Trismus in a patient. The method comprises providing a device is configured to be located completely within the mouth of the patient without any portion extending out of the mouth of the patient. The device comprises a pair of teeth-receiving plates pivotably connected to each other and an adjustable biasing assembly providing a bias force to the teeth-receiving plates and for establishing a desired spacing between anterior portions of the teeth-receiving plates. The adjustable biasing assembly is operated to establish a first desired spacing between the anterior portions of the teeth-receiving plates. The teeth-receiving plates are pivoted with respect to each other to bring the anterior portions of the teeth-receiving plates closely adjacent to each other. The device is inserted completely within the mouth of the patient wherein upper teeth of the patient are located within portions of one of the pair of teeth-receiving plate and lower teeth of the patient are located within portions of the other of the pair of teeth-receiving plates, whereupon the bias provided by the spring in the desired expanded state or the desired contracted state causes the teeth-receiving plates to naturally pivot apart from each other to a desired open position wherein the anterior portions of the teeth-receiving plates are at the first desired spacing from each other.

In accordance with one preferred aspect of the method of this invention, the method additionally comprises removing the device from the mouth of the patient. The adjustable biasing assembly is operated to establish a second desired spacing between the anterior portions of the teeth-receiving plates. The second desired spacing is greater than the first desired spacing. The teeth-receiving plates are pivoted with respect to each other to bring the anterior portions of the teeth-receiving plates closely adjacent to each other. The device is inserted completely within the mouth of the patient wherein upper teeth of the patient are located within portions of one of the pair of teeth-receiving plate and lower teeth of the patient are located within portions of the other of the pair of teeth-receiving plates, whereupon the bias provided by the spring in the desired expanded state or the desired contracted state causes the teeth-receiving plates to naturally pivot apart from each other to a desired open position wherein the anterior portions of the teeth-receiving plates are at the second desired spacing from each other.

In accordance with another preferred aspect of the method of this invention, the method is repeated as necessary, each time operating the adjustable assembly to establish a desired spacing that is greater than the prior desired spacing until the desired spacing is a maximum for the patient.

DESCRIPTION OF THE DRAWING

FIG. 1 is a side elevation illustration, not to scale, of one exemplary embodiment of a device for treating Trismus in a person;

FIG. 2 is an enlarged side elevation view of one portion, i.e., an adjustable biasing assembly in the form of a hinge, a compression spring, a spring adjusting mechanism, and an encapsulating body, of the device for treating Trismus shown in FIG. 1;

FIG. 3 is a sectional view taken along line 3-3 through the encapsulating body of FIG. 2;

FIG. 4 is a sectional view taken along line 4-4 through the encapsulating body of FIG. 2;

FIG. 5 is an enlarged isometric view of the compression spring and the spring adjusting mechanism of FIGS. 1-4, shown without the encapsulation of the encapsulation body; and FIG. 6 is an illustration, similar to FIG. 1, but showing an alternative exemplary embodiment of a device for treating Trismus constructed in accordance with this invention.

DETAILED DESCRIPTION OF THE PREFERRED EMBODIMENT

Referring now to the various figures of the drawing wherein like reference characters refer to like parts, there is shown at 20 in FIG. 1 one exemplary embodiment of a device for treating Trismus in a patient. The device basically comprises a pair of teeth-receiving plates 22 and 24 that are pivotably connected to each other by at least one adjustable biasing assembly 26. The device is designed so that it can be completely disposed within the mouth of a person having Trismus, without any portion of the device 20 sticking out of the person's mouth, so that the teeth-receiving plate 22 receives the upper teeth and contiguous gum structure of the patient and the teeth-receiving plate 24 receives the lower teeth and contiguous gum structure of the patient. The teeth-receiving plate 22 includes an anterior portion 22A and a posterior portion 22B. The teeth-receiving plate includes an anterior portion 24A and a posterior portion 24B. Preferably, each teeth-receiving plate is constructed similarly to a conventional mouth guard, e.g., a plate which is molded of a strong biocompatible material, e.g., silicone, plastic, or other dental quality material, and is contoured or molded so that it can closely and comfortably accommodate the teeth and contiguous gums of the patient.

The at least one adjustable biasing assembly 26 is constructed and configured to act as a hinge to enable the two teeth-receiving plates to be pivoted with respect to each other so that the anterior portions 22A and 24A of the teeth-receiving plates 22 and 24, respectively, are a desired spacing or distance D from each other. Moreover, the adjustable biasing assembly includes means, e.g., a biasing member in the form of a spring 28 or some other biasing means, which biases the anterior portions 22A and 24A apart to hold those anterior portions at the desired distance D, notwithstanding the tendency of the muscles at the jaw of the patient to attempt to close the patient's mouth when the device is in place in the patient's mouth. Further still, the adjustable biasing assembly also includes means, e.g., an adjustment mechanism 30, to enable the spacing or distance D to be adjusted as desired.

In the exemplary embodiment shown there are two identical adjustable biasing assemblies 26. One of the biasing assemblies is located between the anterior portion 22A of the upper teeth receiving plate 22 and the posterior portion 22B of that teeth-receiving plate and preferably adjacent the molars on one side of the patient's mouth. The other of the biasing assemblies is located between the anterior portion 22A of the upper teeth receiving plate 22 and the posterior portion 22B of that teeth-receiving plate and preferably adjacent the molars on other side of the patient's mouth. In accordance with one preferred aspect of this invention at least one adjustable biasing assembly is completely located between the anterior portion and the posterior portion of one of the teeth-receiving plates and also completely located between the anterior portion and the posterior portion of the other of the teeth-receiving plates.

Each adjustable biasing assembly 26 is made up of a hinge 32, the heretofore mentioned spring 28, the heretofore mentioned adjustment mechanism 30 and an encapsulating body 34. The encapsulating body is a body formed of any biocompatible flexible or resilient material, e.g., silicone or a plastic, and includes a top face 34A, a bottom face 34B, a front end face 34C and a rear end face 34D. The top face 34A of one of the encapsulating bodies 34 is fixedly secured to an interior portion of the upper teeth-receiving plate 22 on one side of thereof, with the bottom face 34B of that encapsulating body fixedly secured to an interior portion of the lower teeth-receiving plate 24 on that one side. In a similar manner, the top face 34A of the other of the encapsulating bodies 34 is fixedly secured to an interior portion of the upper teeth-receiving plate 22 on the opposite side, with the bottom face 34B of that other encapsulating body fixedly secured to an interior portion of the lower teeth-receiving plate 24 on that opposite side.

The hinge 32 can take any form, in the exemplary embodiment shown it is in the form of a generally U or V-shaped integral member formed of a strong resilient, biocompatible material, e.g., titanium, stainless steel, carbon fiber, etc. and having a pair of leg sections 32A and 32B which are interconnected at an apex 32C. The leg sections are arranged to be moved with respect to each other, either closer to or further away from each other by the flexing of the hinge at its apex. The movement of the leg sections 32A and 32B apart from each other is accomplished by a bias force applied thereto by the compression spring 28. In particular, as best seen in FIG. 5, the spring 28 is a helical compression spring whose upper end is fixedly secured to a body 30A of the adjustment mechanism 30. The lower end of the spring 28 is fixedly secured to a body 30B of the adjustment mechanism. Thus, the natural bias provided by the compression spring will tend to separate the bodies 30A and 30B from each other.

The adjustment mechanism 30 also includes a threaded shaft 30C interconnecting the bodies 30A and 30B. The threaded shaft 30C, when rotated in one rotational direction about its central longitudinal axis X brings the bodies 30A and 30B towards each other against the natural bias provided by the compression spring 28, and when rotated in the opposite rotational direction about axis X enables the spring to bring the bodies 30A and 30B away from each other. The amount that the spring is compressed is a function of the spacing of the bodies 30A and 30B, and the spacing of those bodies is a function of the amount and direction that the shaft is rotated about the axis X. Rotation of the threaded shaft about the axis X in either rotational direction is achieved by means of a rotatable motion translation mechanism (not shown) which is coupled to a threaded Allen head screw 30D disposed within a threaded bore hole in the body 30B. The Allen head screw 30D is configured to be rotated about a transverse axis Y, which is perpendicular to the longitudinal axis X, by use of a conventional Allen wrench tool 36. The rotatable motion translation mechanism is located within the interior of the body 30B and serves to convert the rotation of the Allen screw about the axis Y into corresponding rotation of the threaded rod 30C about the axis X, thereby either moving the bodies 30A and 30B closer together or further apart. Thus, the rotation of the Allen screw establishes the desired spacing D between the anterior portions 22A and 24A of the teeth-receiving plates.

Use of the device 20 by a patient with Trismus is as follows. The device should be adjusted to establish the initial spacing of the anterior portions of the teeth-receiving plates for the particular patient. To that end, with the device located outside of the patient's mouth, an end of the Allen wrench tool 36 is inserted through an aperture in the encapsulating body 34 of the adjustable biasing assembly 26. In particular, while not shown in FIG. 2, the encapsulating body 34 of the device 20 of FIG. 1, includes an aperture in its end face 34C which is aligned with the Allen screw 30D so that an end portion of the Allen wrench tool 36 can be passed through the aperture in the body 34 to engage the head of the Allen screw 30D. The tool 36 is then rotated about its axis to rotate the Allen screw 30D in the desired rotational direction about the axis Y, until the anterior portions of the teeth-receiving plates are at the desired initial spacing or distance D. The anterior portions of the teeth-receiving plates can then be pivoted together against the bias provided by the spring to cause the device 20 to be in a compact state ready for introduction into the mouth of the patient. That action is accomplished by the patient opening his/her mouth so that the posterior end of the device 20 can be inserted into his/her mouth, so that the patient's upper teeth and contiguous gums are located within the upper teeth-receiving plate 22 and the patient's lower teeth and contiguous gums are located within the lower teeth-receiving plate. The bias provided by the spring 28, will then cause the anterior portions of the upper and lower teeth-receiving plates to move apart until they are at the preselected distance or spacing D.

The patient will then repeatedly compress his/her mouth causing the pterygoid muscles and ligaments to expand and contract being careful not to over-stretch which may cause pain/or discomfort. That repeated action at the initial distance or spacing D will gradually manipulate the pterygoid muscles and ligaments in the jaw to open with less stress on the teeth. Moreover, since the opening of the jaw is effected not from the front of the mouth, but from a point adjacent the molars (e.g., upper teeth #s 2, 3, 4 and 13, 14, 15, and lower teeth #s 18, 19, 20 and 29, 30, 31), the exercising of the opening of the patient's mouth should be easier and less painful for the patient. Once the patient can readily open his/her mouth to the initial position, the adjustable biasing assembly can be readjusted to increase the distance or spacing D, by use of the tool 36. In particular, with the device 20 outside of the patient's mouth, an end of the tool 36 can be inserted through the aperture in the encapsulating body 34 of the adjustable biasing assembly 26 to rotate the Allen screw 30D in the desired rotational direction about the axis Y, until the anterior portions of the teeth-receiving plates are at the new desired spacing or distance D, which is greater that the initial distance or spacing. The anterior portions of the teeth-receiving plates can then be pivoted together against the bias provided by the spring into the compact state so that the device 20 can be introduced into the patient's mouth as described above, whereupon the patient's upper teeth and contiguous gums are located within the upper teeth-receiving plate 22 and the patient's lower teeth and contiguous gums are located within the lower teeth-receiving plate. The bias provided by the spring 28, will then cause the anterior portions of the upper and lower teeth-receiving plates to pivot apart by the new (larger) preselected distance or spacing D.

The device 20 can be adjusted and used as much as necessary to properly stretch the pterygoid muscles and ligaments in the jaw, but not beyond an anatomically correct amount, e.g., approximately 40 to 60 mm.

In FIG. 6 there is shown an alternative embodiment of a device 20' constructed in accordance with this invention. That device is identical in construction to device 20 except that the adjustable biasing assembly 26' makes use of a tension spring 28' instead of the compression spring 28. In the interest of brevity the components of the device 20' which are common with the components of the device 20 will be given the same reference numbers and the details of their construction, arrangement and operation will not be reiterated.

Thus, as can be seen in FIG. 6 the adjustable biasing assembly 26' is secured between the teeth receiving plates 22 and 24 at approximately the same location as the adjustable biasing assembly 26 of the device 20, but is oriented in the opposite direction, i.e., the apex 32C of the hinge is directed anteriorly, rather than posteriorly. Since the spring 28' is a tension spring and since the hinge 32 is located in the opposite direction, the increasing of the spacing D between the anterior portions of the teeth-receiving plates 22 and 24 is achieved by rotating the Allen screw in the rotational direction about axis Y to bring the spring adjustment bodies 30A and 30B closer together rather than further apart. The hinge 32 includes a window or opening 32D adjacent but slightly below the apex 32C so that it is aligned with the Allen screw 30D to enable the end of the Allen wrench tool 36 to be inserted therethrough from an anterior direction like shown in FIG. 6 to establish the desired spacing D between the anterior portions of the teeth-receiving plates. To that end, the encapsulating body 34 includes another aperture (not shown) in the end face 34C which is adjacent the opening or window 32D in the hinge 32 through which the end portion of the Allen wrench tool can be inserted to adjust the Allen screw of the device 20' of FIG. 6.

The use of the device 20' is identical to the use of the device 20 so that it will not be reiterated.

As should be appreciated by those skilled in the art, the subject invention offers various advantages over the prior art devices, since it is simpler in construction, easier to use, doesn't require significant hand strength to establish the desired amount of force to the jaw, and applies the jaw opening force equally to all of the teeth and not merely to the front teeth. Thus, the use of the invention should make the jaw opening process and training easier and less painful for the patient.

It should be noted that the exemplary embodiments of the devices 20 and 20' are but a few examples of various structures and configurations that can be made in accordance with this invention to carry out its ends. Moreover, the methods of use of those should not be deemed to constitute all of the ways that those devices can be used.

Without further elaboration the foregoing will so fully illustrate our invention that others may, by applying current or future knowledge, adopt the same for use under various conditions of service.

We claim:

1. A device for treating Trismus in a patient, said device being sized and configured to be located completely within the mouth of the patient without any portion extending out of the mouth of the patient, said device comprising:
   a pair of teeth-receiving plates sized and configured to be located completely within the mouth of the patient without any portion extending out of the mouth of the patient, each of said pair of teeth-receiving plates including an anterior portion and a posterior portion, with one of said pair of teeth-receiving plates being disposed over the other of said pair of teeth-receiving plates to establish a space between said anterior portion of said one of said pair of teeth-receiving plates and said anterior portion of the other of said pair of teeth-receiving plates; and
   at least one adjustable biasing assembly comprising a spring, a hinge, and a rotatable shaft, said at least one adjustable biasing assembly being sized and configured to be located completely within the mouth of the patient without any portion extending out of the mouth of the patient and interposed completely between the anterior portion and the posterior portion of said one of said pair of teeth-receiving plates and also interposed completely between the anterior portion and the posterior portion of the other of said pair of teeth-receiving plates, said at least one adjustable biasing assembly interconnecting said pair of teeth-receiving plates and being configured for pivotably connecting said pair of teeth-receiving plates to each other to establish a spacing between said anterior portions of said pair of teeth receiving plates and for providing a bias force to said pair of teeth receiving plates, said rotatable shaft being configured to be rotated to adjust said spacing and comprising said spring which is configured to naturally expand or contract.

2. The device of claim 1, wherein said spring is configured to expand to an expanded state and to contract to a contracted state, wherein said spring is coupled between said one of said pair of teeth-receiving plates and the other of said pair of teeth-receiving plates to provide said bias force to said pair of teeth-receiving plates, and wherein said at least one adjustable biasing assembly additionally comprises:
   said hinge interconnecting said pair of teeth-receiving plates between said anterior portion and said posterior portion of said one of said pair of teeth-receiving plates; and
   the rotatable shaft is configured to adjust the expansion of said spring to said expanded state or the contraction of said spring to said contracted state, in either case establishing said spacing.

3. The device of claim 2, wherein said device is configured so that said pair of teeth-receiving plates can be pivoted together at said hinge to a closed position, whereupon said anterior portions of said pair of teeth-receiving plates are closely adjacent to each other to enable said device to be readily inserted into the mouth of the patient, whereupon the bias force provided by said spring in said expanded state or said contracted state causes said pair of teeth-receiving plates to naturally pivot apart from each other to an open position wherein said anterior portions of said pair of teeth receiving plates are at said spacing.

4. The device of claim 1, wherein each of said pair of teeth-receiving plates includes a pair of sides and wherein said at least one adjustable biasing assembly comprises two adjustable biasing assemblies, one of said two adjustable biasing assemblies comprising a spring, a hinge, and a rotatable shaft and being located adjacent one side of said pair of sides and the other of said two adjustable biasing assemblies comprising a spring, a hinge, and a rotatable shaft and being located adjacent the other side of said pair of sides.

5. The device of claim 2 wherein said rotatable shaft is configured to be rotated by a tool to adjust the amount that said spring expands to the expanded state or contracts to the contracted state.

6. The device of claim 1, wherein each of said pair of teeth-receiving plates is molded of a strong material to distribute said bias force thereacross.

7. The device of claim 2, wherein said hinge comprises a flexible strip formed of a strong biocompatible material.

8. The device of claim 7, wherein said strong biocompatible material comprises stainless steel or titanium.

9. The device of claim 2, wherein said at least one adjustable biasing assembly additionally comprises a body encapsulating said hinge, said spring and said rotatable shaft.

10. The device of claim 9, wherein said body comprises a resilient material.

* * * * *